United States Patent
Ardanese et al.

(10) Patent No.: US 9,528,462 B2
(45) Date of Patent: Dec. 27, 2016

(54) NOX SENSOR PLAUSIBILITY MONITOR

(75) Inventors: Raffaello Ardanese, Troy, MI (US); Manoharan Thiagarajan, Milford, MI (US); Justin A. Shetney, Livonia, MI (US); Janean E. Kowalkowski, Northville, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 1023 days.

(21) Appl. No.: 13/524,415

(22) Filed: Jun. 15, 2012

(65) Prior Publication Data

US 2013/0338900 A1 Dec. 19, 2013

(51) Int. Cl.
| | | |
|---|---|---|
| *G01M 15/00* | (2006.01) | |
| *F02D 41/14* | (2006.01) | |
| *F02D 41/22* | (2006.01) | |
| *F02D 41/24* | (2006.01) | |

(52) U.S. Cl.
CPC ....... *F02D 41/1463* (2013.01); *F02D 41/1465* (2013.01); *F02D 41/222* (2013.01); *F02D 41/2422* (2013.01); *Y02T 10/40* (2013.01)

(58) Field of Classification Search
CPC ........ Y02T 10/47; Y02T 10/40; F01N 11/007; F02D 41/222; F02D 41/1463; F02D 41/1465; F02D 41/2422
USPC ........ 73/114.69–114.77; 123/568.11, 568.21, 123/672; 701/102, 109–111, 115; 702/182–185
See application file for complete search history.

(56) References Cited

U.S. PATENT DOCUMENTS

| | | | | |
|---|---|---|---|---|
| 6,539,705 | B2* | 4/2003 | Beer | F01N 11/00 60/274 |
| 7,484,407 | B2* | 2/2009 | Arlt | F01N 3/101 73/114.75 |
| 7,487,631 | B2* | 2/2009 | Cueman | F01N 3/106 123/1 A |
| 8,091,416 | B2* | 1/2012 | Wang | F01N 3/2066 73/114.75 |
| 8,401,727 | B2* | 3/2013 | Arlt | F02D 41/146 701/29.1 |
| 2004/0089060 | A1* | 5/2004 | Suzuki | G01N 27/4175 73/114.73 |

(Continued)

FOREIGN PATENT DOCUMENTS

DE 102006053841 A1 * 5/2008
JP 04326012 A * 11/1992

(Continued)

*Primary Examiner* — Joseph Dallo
(74) *Attorney, Agent, or Firm* — Quinn Law Group

(57) ABSTRACT

A vehicle includes an engine, an exhaust system, and a controller. The exhaust system includes a selective catalytic reduction (SCR) device, and a rear nitrogen oxide (NOx) sensor. The controller, which is in communication with the NOx sensor, includes a processor and tangible, non-transitory memory. A plurality of data maps and a plurality of binary maps are recorded in memory. Each data map is indexed by a different pair of exhaust system performance values. Each cell of each data map is populated by estimated downstream NOx levels. The binary maps are indexed by one of the pairs of exhaust system performance values. Each cell of each binary map is populated by a binary value, i.e., a 0 or 1. The controller uses the data maps and the binary maps to execute a control action with respect to the exhaust system, such as verifying plausibility of the rear NOx sensor.

18 Claims, 2 Drawing Sheets

(56) References Cited

U.S. PATENT DOCUMENTS

| | | | |
|---|---|---|---|
| 2004/0238378 A1* | 12/2004 | Kumazawa | G01N 27/4175 |
| | | | 205/781 |
| 2008/0089820 A1 | 4/2008 | Jacob | |
| 2008/0102010 A1 | 5/2008 | Bruck et al. | |
| 2008/0149081 A1 | 6/2008 | Allain | |
| 2009/0151425 A1* | 6/2009 | Miwa | G01N 33/0037 |
| | | | 73/23.31 |
| 2010/0031633 A1* | 2/2010 | Kitazawa | F01N 3/0807 |
| | | | 60/276 |
| 2010/0037683 A1* | 2/2010 | Barnikow | F02D 41/1495 |
| | | | 73/114.72 |
| 2010/0107605 A1* | 5/2010 | Brinkman | B01D 53/9418 |
| | | | 60/274 |
| 2010/0218487 A1* | 9/2010 | Wang | F01N 11/005 |
| | | | 60/287 |
| 2011/0000290 A1* | 1/2011 | Sawada | F02D 41/1461 |
| | | | 73/114.75 |
| 2011/0077818 A1* | 3/2011 | Arlt | F02D 41/146 |
| | | | 701/29.2 |
| 2011/0118905 A1* | 5/2011 | Mylaraswamy | G05B 23/0251 |
| | | | 701/3 |
| 2011/0202253 A1* | 8/2011 | Perry | F01N 13/009 |
| | | | 701/102 |

FOREIGN PATENT DOCUMENTS

| | | | |
|---|---|---|---|
| JP | H08334014 A | | 12/1996 |
| JP | 2004219116 A | * | 8/2004 |
| JP | 2009168617 A | * | 7/2009 |
| WO | 2005047663 A2 | | 5/2005 |

* cited by examiner

| | 50 | 100 | 150 | } $V_2$ |
|---|---|---|---|---|
| 400 | .33 | .50 | .58 | |
| 300 | .12 | .31 | .44 | |
| 200 | .11 | .14 | .18 | |

$V_1$ | $V_3$

| | 50 | 100 | 150 | } $V_2$ |
|---|---|---|---|---|
| 400 | 1 | 1 | 1 | |
| 300 | 0 | 1 | 1 | |
| 200 | 0 | 1 | 0 | |

$V_1$ | $V_3$

NOX SENSOR PLAUSIBILITY MONITOR

TECHNICAL FIELD

The present disclosure relates to a method and apparatus for monitoring the plausibility of output readings from a rear/downstream nitrogen oxide (NOx) sensor of the type used in an engine exhaust system.

BACKGROUND

Diesel engines and, to a lesser extent, other internal combustion engines generate nitrogen oxide (NOx) gasses as byproducts of the fuel combustion process. NOx gasses may be present in an exhaust stream in various forms, including as nitric oxide (NO), nitrogen dioxide ($NO_2$), and nitrous oxide ($N_2O$). A selective catalytic reduction (SCR) device is typically used as part of a vehicle exhaust system to reduce NOx gasses before the exhaust is discharged into the atmosphere. The catalytic action of the SCR device and an associated reductant such as ammonia or urea ultimately converts NOx gasses into inert byproducts, i.e., nitrogen and water.

In vehicles having a diesel engine, NOx sensors are typically positioned upstream and downstream of the SCR device. The upstream or front NOx sensor measures NOx levels emitted by the engine, while the downstream/rear NOx sensor measures NOx levels remaining in the exhaust stream after treatment by the SCR device. Together, the front and rear NOx sensor measurements are used to calculate the overall NOx removal efficiency. Because a high degree of confidence is required in the levels of NOx gasses discharged by vehicles, certain government agencies require the calculation and recording of NOx removal efficiency. Additionally, periodic monitoring of the plausibility of any readings from the rear NOx sensor is required to ensure the overall operational integrity of a diesel exhaust system.

SUMMARY

A vehicle is disclosed herein that uses an onboard controller to monitor the plausibility of readings from a downstream/rear nitrogen oxide (NOx) sensor. The vehicle may include an internal combustion engine, such as but not limited to a diesel engine. The vehicle includes a front NOx sensor, the rear NOx sensor, and a controller. The controller uses a calibrated set of maps each indexed by a pair of exhaust system performance values, e.g., a selective catalytic reduction (SCR) device temperature, a modeled SCR efficiency, NH3 loading deviation, and/or an SCR temperature gradient. By using these maps, the controller is able to pinpoint areas of high probability for NOx breakthrough, areas which may otherwise be avoided by conventional sensor plausibility approaches. The map-identified areas are then used as entry conditions for launching rear NOx performance diagnostics, thereby improving the robustness of such calculations while also reducing reported instances of false failure as noted below.

In particular, the vehicle may include an internal combustion engine, an exhaust system, and a controller having a processor. The exhaust system includes an SCR device as well as front and rear NOx sensors. The controller, which is in communication with the NOx sensors, includes a processor and tangible, non-transitory memory on which is recorded a plurality of data maps and a corresponding plurality of binary maps. Each data map is indexed by a different pair of exhaust system performance values, and each cell of each data map is populated by estimated downstream NOx levels. The binary maps are indexed by a corresponding one of the pairs of exhaust system performance values. The processor uses the data maps and the binary maps to execute a control action with respect to the exhaust system using measurements from the rear NOx sensor, and using the extracted information. For example, the controller may determine that rear NOx sensor readings are plausible only when all of the binary maps return the same binary value, e.g., 1, as set forth in detail below.

A method is also disclosed herein for use in a vehicle having an internal combustion engine, an exhaust system that includes a pair of NOx sensors and an SCR device, and a controller. The method includes recording the data maps and binary maps noted above in memory of the controller, with each map indexed by a corresponding pair of exhaust system performance values. The method further includes receiving, via the controller, the exhaust system performance values, and then using information from the NOx sensors and from the data and binary maps to execute, via the processor, a control action with respect to the exhaust system.

A controller is also disclosed herein for use with a vehicle having an engine and an exhaust system. The controller includes a host machine and tangible, non-transitory memory. The host machine has a processor that is in communication with front and rear NOx sensors of the exhaust system. Recorded in memory is a set of process instructions that is executable by the processor, as well as the data and binary maps noted above. The processor is configured to selectively execute the process instructions to thereby extract data from the data maps and from the binary maps to determine whether rear NOx sensor readings are plausible, and to thereafter diagnose the performance of the rear NOx sensor as a control action.

The above features and advantages and other features and advantages of the present invention are readily apparent from the following detailed description of the best modes for carrying out the invention when taken in connection with the accompanying drawings.

DESCRIPTION

Figure 1:
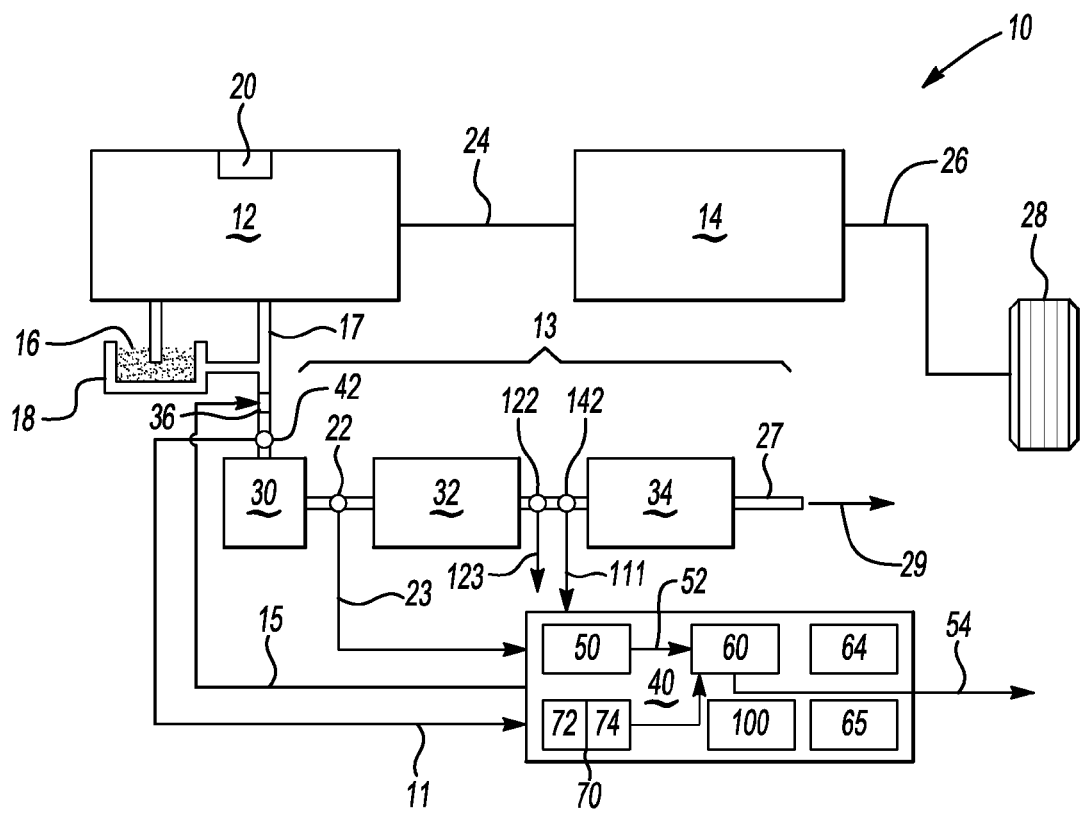
FIG. 1 is a schematic illustration of a vehicle having a rear nitrogen oxide (NOx) sensors, and a controller having a recorded map which the controller uses to monitor the plausibility of readings from the rear NOx sensor.

Referring to the drawings, an example vehicle 10 having an exhaust system 13 is shown in FIG. 1. The vehicle 10 includes a controller 40 that is configured to execute process instructions embodying a method 100, an example of which is described below with reference to FIG. 4. Execution of the method 100 enables the controller 40 to act as a plausibility monitor with respect to a rear nitrogen oxide (NOx) sensor 142, which is one of a pair of conventional NOx sensors 42 and 142 used aboard the vehicle 10. In executing the method 100, the controller 40 also identifies ideal entry conditions for diagnosing performance of the rear NOx sensor 142 within the exhaust system 13.

The NOx sensors 42 and 142 may be constructed of a suitable metal oxide, for instance yttria stabilized zirconia (YSZ). As is well understood in the art, over time a NOx sensor such as the NOx sensors 42, 142 described herein may become stuck at a particular value, or the response time of such sensors may become unacceptably slow. Sensor degradation may occur due to clogging from soot, sensor cracking, and/or hydrocarbon sensor poisoning.

However, NOx sensors that work properly may be falsely diagnosed as having failed. This may occur when a control system initiates NOx removal efficiency diagnostics under non-ideal conditions, or perhaps by not launching such diagnostics when conditions are otherwise appropriate. The present approach is therefore intended to improve the robustness of NOx removal efficiency diagnostics and rear NOx sensor 142 plausibility monitoring in the vehicle 10, thereby preventing false failures. The present approach may have the additional benefit of reducing unnecessary warranty repair costs that often result from an incorrect diagnosis.

The vehicle 10 includes an internal combustion engine 12 having an air intake 20, e.g., a diesel engine or any other engine that emits significant levels of nitrogen oxide (NOx) gasses. While a diesel application is described hereinafter for illustrative consistency, those of ordinary skill in the art will appreciate that a similar approach may be taken with respect to other engine designs. Aboard the vehicle 10, combustion of diesel fuel 16 drawn from a tank 18 generates the exhaust stream (arrow 29), which is then processed through the exhaust system 13 before being ultimately discharged from a tailpipe 27 into the surrounding atmosphere. Energy released by combustion of the diesel fuel 16 produces torque on a rotatable input member 24 of a transmission 14. Input torque from the engine 12 is transferred through the various gear sets, clutches, brakes, and interconnecting members (not shown) of the transmission 14 to a rotatable output member 26. Output torque from the transmission 14 is thus delivered to a set of drive wheels 28, only one of which is shown in FIG. 1 for illustrative simplicity.

The exhaust system 13 shown schematically in FIG. 1 is in fluid communication with an exhaust port(s) 17 of the engine 12. Depending on the embodiment, the exhaust system 13 may include an oxidation catalyst 30, a selective catalytic reduction (SCR) device 32, and a diesel particulate filter (DPF) 34 arranged in any desired order. The SCR device 32 is configured to convert NOx gasses into water and nitrogen as inert byproducts of combustion using an injection from a tank (not shown) of a suitable reductant, e.g., ammonia ($NH_3$) or urea, and an active catalyst. For example, the SCR device 32 may be configured as a ceramic brick or a ceramic honeycomb structure, a plate structure, or any other suitable design. Collectively, the oxidation catalyst 30, the SCR device 32, and the DPF 34 provide the necessary conditioning of the exhaust stream (arrow 29). Temperature sensors 22 and 122 may be positioned upstream and downstream of the SCR device 32, respectively, with respective measured temperatures (arrows 23, 123) relayed to the controller 40.

The vehicle 10 may also include a fuel injection device 36 that is in electronic communication with the controller 40, and that is controlled via a set of control signals (arrow 15) from the controller 40. The fuel injection device 36 is in fluid communication with the tank 18. When signaled by the controller 40, the fuel injection device 36 selectively injects some of the fuel 16 into the exhaust stream (arrow 29), e.g., upstream of or directly into the oxidation catalyst 30. The injected fuel 16 is then burned in a controlled manner within the oxidation catalyst 30 to generate heat at levels sufficient for regenerating the particulate filter 34.

The NOx sensor 42 is positioned upstream with respect to the SCR device 32, such as at the outlet of the engine 12. Thus, the NOx sensor 42 is referred to hereinafter as the front NOx sensor 42. The rear NOx sensor 142 is positioned downstream with respect to the SCR device 32, for instance just before the DPF 34. Thus, the NOx sensor 142 is referred to hereinafter as the rear NOx sensor 142. Structurally and functionally, the NOx sensors 42 and 142 may be otherwise identical. NOx level measurements (arrows 11, 111) from the respective upstream and downstream NOx sensors 42 and 142 are fed into the controller 40. The controller 40 then determines, via execution of the present method 100, whether appropriate entry conditions are present for monitoring the plausibility of measurements from the rear NOx sensor 142.

The controller 40 of FIG. 1 may be embodied as a digital computer or microcomputer acting as a vehicle control module, and/or as a proportional-integral-derivative (PID) controller device having a processor 64, and tangible, non-transitory memory 65 such as read-only memory (ROM) or flash memory. The controller 40 may also have random access memory (RAM), electrically erasable programmable read only memory (EEPROM), a high-speed clock, analog-to-digital (A/D) and/or digital-to-analog (D/A) circuitry, and any required input/output circuitry and associated devices, as well as any required signal conditioning and/or signal buffering circuitry. The method 100 and any required reference calibrations may be stored within or readily accessed by the controller 40 to provide the functions described below.

In a particular embodiment, the controller 40 may be embodied as a host machine as shown, or as a distributed system, and may include an engine control module (ECM) 50, a diagnostic control module (DCM) 60, and a recorded set of maps 70. As explained below with reference to FIGS. 3 and 3A, the maps 70 may include a calibrated data map 72 and a corresponding binary map 74, with a given map pair (72 and 74 together) used for each of a plurality of different pairs of exhaust system performance values. Some of these values may include engine performance values (arrow 52) generated or recorded by the ECM 50. The engine performance values (arrow 52) may be transmitted to the DCM 60 over an RS232 serial bus or any other suitable communications channel, and used by the DCM 60 in execution of the present method 100. Likewise, the DCM 60 has access to the information recorded in the maps 70, with the information from the maps 70 ultimately used by the controller 40 to generate a diagnostic signal (arrow 54) suitable for commanding execution of various control actions, some of which are explained below with reference to FIG. 4.

Figure 2:
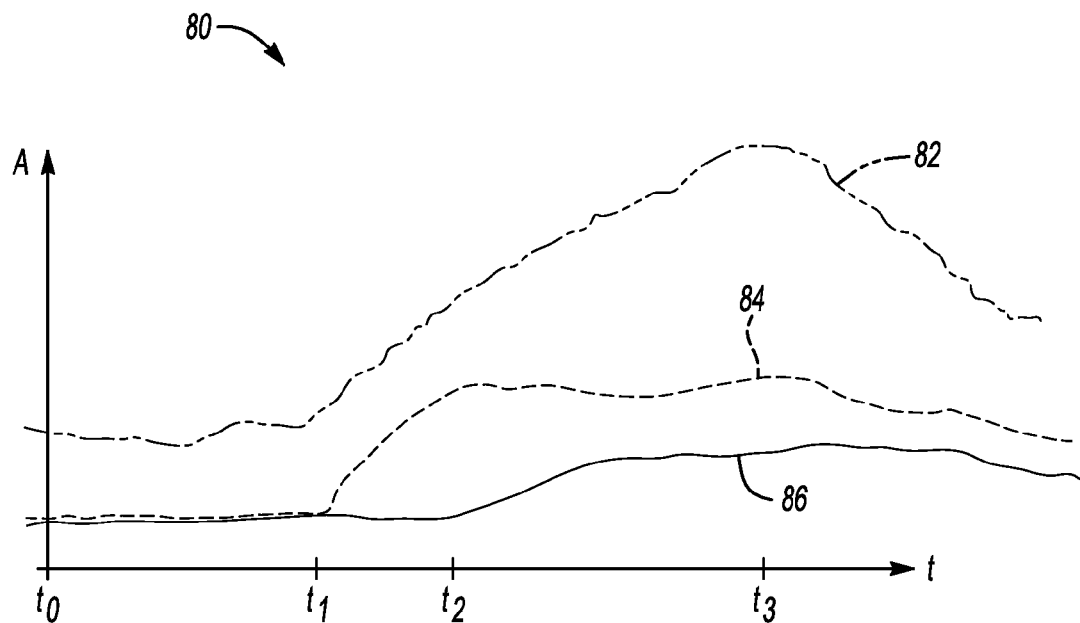
FIG. 2 is a set of example time traces describing an operation of the vehicle shown in FIG. 1, with time denoted on the horizontal axis and amplitude denoted on the vertical axis.

Referring to FIG. 2 in conjunction with the structure of the example vehicle 10 shown in FIG. 1, a set of traces 80 illustrates the fundamental approach of the present method 100. The set of traces 80 includes traces 82, 84, and 86, each having amplitude A that is plotted on the vertical axis. Time (t) is plotted on the horizontal axis.

Trace 82 represents the changing exhaust flow (arrow 29) of FIG. 1. At $t_0$, such flow is minimal. The flow increases beginning at $t_1$, e.g., when a driver of the vehicle 10 of FIG.

1 depresses an accelerator pedal to command output torque from the engine 12. Exhaust flow increases between $t_1$ and $t_3$, at which point the exhaust flow indicated by trace 82 tails off, perhaps in response to a driver releasing the accelerator pedal.

Trace 84 represents the changing NOx level as measured by the front NOx sensor 42 of FIG. 1. Almost immediately after the driver requests more output torque from the engine 12 at $t_1$, the front NOx sensor 42 begins to read increasing NOx levels. Such levels begin to stabilize at about $t_2$, thereafter remaining more or less constant.

Trace 86 of FIG. 2 represents the changing NOx level as measured by the rear NOx sensor 142 of FIG. 1. Due to the distance between the engine 12 and the rear NOx sensor 142, as well as the interposition of the SCR device 32 which removes some of the NOx from the exhaust stream, trace 86 does not begin to rise until after the front NOx sensor 42 responds. This delay is seen in the interval between $t_1$ and $t_2$. After $t_2$, the output of the rear NOx sensor 142 rises, plateaus, and eventually decreases at $t_3$ when the driver reduces the torque demand on the engine 12.

Overall NOx removal efficiency may be calculated by the controller 40 using the following basic equation:

$$\frac{NOx_{IN} - NOx_{OUT}}{NOx_{IN}}$$

where $NOx_{IN}$ is the amount of NOx gasses measured by the front NOx sensor 42, or trace 84 of FIG. 2, and $NOx_{OUT}$ is the amount of NOx gasses measured by the rear NOx sensor 142, or trace 86 of FIG. 2. Diagnostic codes may be set indicating the need to replace the front or rear NOx sensors 42, 142 when testing performed at more appropriate times would reveal that sensor to be functioning properly. The present method 100 improves the robustness of the overall diagnostic approach for the rear NOx sensor 142 by closely monitoring entry conditions for launching of plausibility monitoring and performance diagnostics for the rear NOx sensor 142.

Figures 3, 3A, 4:
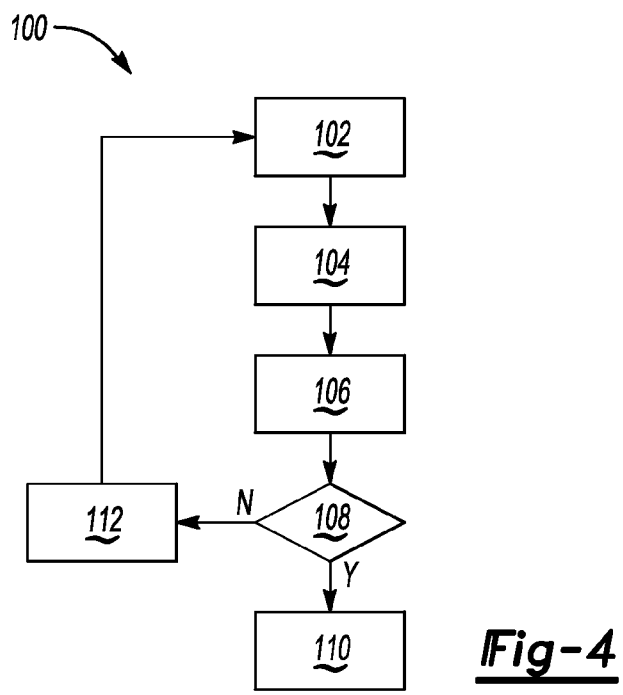
FIG. 3 is a schematic illustration of an example data map that may be used with the present diagnostic approach.
FIG. 3A is a schematic illustration of an example binary map that corresponds to the data map shown in FIG. 3.
FIG. 4 is a flow chart describing an example method for monitoring the plausibility of readings from a rear NOx sensor in the vehicle of FIG. 1.

Referring to FIG. 3, the controller 40 of FIG. 1 uses map-based enabling conditions that involve interaction between different vehicle performance values. In a particular embodiment these values include SCR temperature, estimated SCR efficiency, NH3 loading deviation, and exhaust flow. Corresponding NOx values, e.g., estimated or pre-calculated downstream NOx levels, are recorded in a corresponding data map 72, which may have at least nine cells $V_3$ as shown.

An example data map 72 is shown in FIG. 3 that is populated with sample data. A given data map 72 may be indexed by desired data pairs $V_1$ and $V_2$, e.g., SCR temperature (° C.) and exhaust mass flow rate (kg/hr), respectively. For instance, SCR temperature may have example levels of 0 to 200° C., 200 to 300° C., and 300 to 400° C., which may be measured in place in the vehicle 10 of FIG. 1 using the temperature sensors 22. Other levels may be used, and/or additional cells $V_3$ may be added to cover higher temperatures. Likewise, mass flow rate, here shown in increments of 50 kg/hr, may be measured or calculated offline, for example using the air-fuel ratio and fuel consumption data, or using any other suitable approach. The cells $V_3$ of this particular data map 72 may be populated with calibrated values of changing actual or relative NOx levels, whether determined experimentally or estimated.

Referring to FIG. 3A, an example binary table 74 is shown that corresponds to the data table 72 of FIG. 3. Thus, each binary table 74 may have the same number of cells $V_3$ as its corresponding data table 72. Each of the cells $V_3$ is populated with a corresponding binary value. Determination of whether or not a particular cell $V_3$ requires a 0 or a 1 may be made offline, for instance during calibration. The cells having a 1 as shown in FIG. 3, for instance, may correspond to relatively high levels of downstream NOx, while a 0 may be placed in a cell having a relatively low downstream NOx level. Other data may populate the data maps 72, and therefore NOx levels are merely a non-limiting example.

The data map 72 of FIG. 3, once populated and recorded in memory of the controller 40 of FIG. 1, may be overlaid by the binary map 74 of FIG. 3A. Again, other data and binary maps 72 and 74 may be indexed differently, such as by SCR temperature and estimated SCR efficiency, SCR temperature and NH3 loading in the SCR device 32 of FIG. 1, exhaust flow rate and upstream NOx levels (i.e., NOx as measured by the front NOx sensor 42 of FIG. 1), SCR temperature and SCR temperature gradient, etc. While a single data and binary map pairing may be used in the simplest embodiment, a plurality of map pairings may serve to improve the robustness of the overall method 100. Once all binary maps 74 have been created, the controller 40 of FIG. 1 can enable NOx efficiency calculations as a function of the binary values in the various binary maps 74.

Referring to FIG. 4, an example method 100 is shown for monitoring the plausibility of any readings output to the controller 40 of FIG. 1 by the rear NOx sensor 142. Beginning with step 102, the controller 40 of FIG. 1 may begin monitoring various vehicle performance values such as engine speed, exhaust temperature, and exhaust flow rate. As part of step 102, the controller 40 may calculate values such as modeled or estimated ammonia (NH3) loading and NOx removal efficiency of the SCR device 32 (see FIG. 1), and may measure the upstream and downstream NOx levels using the respective front and rear NOx sensors 42 and 142. All values may be recorded in memory of the controller 40. The method 100 then proceeds to step 104.

At step 104, the controller 40 may associate the values from step 102 to a corresponding one of the data maps 72 (see FIG. 3). Step 104 may entail multiple such comparisons. For instance, if four different data maps 72 are used, with each having a different pairing of vehicle values, e.g., SCR temperature and mass exhaust flow rate in one and SCR temperature and NH3 load deviation in another, then step 104 would associate the measured/calculated data pairs with a given data map 72. Part of step 104 may entail identifying the particular cell V3 (see FIG. 3) that corresponds to the pair.

At step 106, the controller 40 of FIG. 1 next extracts the associated binary number from the corresponding binary map 74 (see FIG. 3A). The extracted binary number for each pairing is recorded in memory of the controller 40 as part of this step.

At step 108, the controller 40 determines whether any one of the binary values from step 106 is 0. If so, the method 100 proceeds to step 112. Otherwise, if all extracted binary values are equal to 1 at step 106, the method 100 proceeds to step 110.

At step 110, the controller 40 may diagnose the performance of the rear NOx sensor 142. As part of step 110, the NOx sensor 142 of FIG. 1 may transmit its measured NOx level (arrows 111) to the controller 40. The controller 40 may then calculate the NOx level as read by the rear NOx sensor 142 at different points in time, e.g., $t_1$, $t_2$, etc. The controller 40 may then compare these readings, each of which may correspond to different vehicle throttle events such as heavy throttle, light throttle, etc., to calibrated thresholds. The calibrated thresholds may be pre-recorded in memory as a set of expected values, whether validated offline using calibration vehicles, calculated using theoretical values, or using any other suitable means. Control actions that may be taken as part of step 110 or a subsequent step include recording a diagnostic code indicating whether the expected result occurred.

At step 112, the controller 40 may record a diagnostic code confirming a decision not to proceed with diagnostics of the rear NOx sensor 142 before repeating step 102. In a possible embodiment, the controller 40 may periodically review the number of recorded "do not proceed" decisions to verify the accuracy of the data recorded in the data maps 72 and/or the binary maps 74 of respective FIGS. 3 and 3A. As all data in the maps 72 and 74 can be calibrated and recorded, periodic verification and updating may be desirable so as to ensure the continuing accuracy of the present approach.

While the best modes for carrying out the invention have been described in detail, those familiar with the art to which this invention relates will recognize various alternative designs and embodiments for practicing the invention within the scope of the appended claims.

The invention claimed is:

1. A vehicle comprising:
an internal combustion engine; and
an exhaust system in fluid communication with the engine, and including:
a selective catalytic reduction (SCR) device;
a rear NOx sensor positioned downstream of the SCR device, and configured to measure NOx levels downstream of the SCR device; and
a controller in communication with the rear NOx sensor, wherein the controller includes a processor and tangible, non-transitory memory on which is recorded:
a plurality of data maps each indexed by a different pair of exhaust system performance values and each having a plurality of cells, wherein the cells of each data map are populated by estimated downstream NOx levels; and
a plurality of binary maps each indexed by a corresponding one of the pairs of exhaust system performance values and having a plurality of cells, wherein each of the cells of each of the binary maps is populated by a binary value of 1 or 0;
wherein the processor is configured to: extract information from the data maps and binary values from the binary maps, receive measurements of the downstream NOx levels from the rear NOx sensor, verify the plausibility of the received measurements of the downstream NOx levels using the extracted binary values from the binary maps and the extracted information from the data maps, and execute a control action with respect to the exhaust system using the downstream NOx level measurements from the rear NOx sensor and the extracted information from the data maps, including diagnosing performance of the rear NOx sensor within the exhaust system.

2. The vehicle of claim 1, wherein the processor is further configured to compare the downstream NOx level measurements received from the rear NOx sensor to calibrated thresholds for a plurality of different vehicle throttle events to thereby verify the plausibility of the received measurements of the downstream NOx levels.

3. The vehicle of claim 2, wherein the processor is further configured to receive the exhaust system performance values and associate pairs of the received exhaust system performance values with a corresponding one of the data maps.

4. The vehicle of claim 1, wherein the processor is further configured to:
receive the exhaust system performance values;
associate each pair of the exhaust system performance values with a corresponding one of the data maps;
identify the particular cell within each of the data maps that corresponds to the associated pair of exhaust system performance values for that particular data map;
extract the binary value corresponding to each identified cell from corresponding binary map; and
verify the plausibility of the measurements of the downstream NOx levels only when each of the extracted binary values has the same value.

5. The vehicle of claim 1, wherein the engine is a diesel engine.

6. The vehicle of claim 1, wherein the exhaust system includes a temperature sensor operable for measuring an SCR temperature of the SCR device, and wherein at least one of the data maps is indexed by the measured SCR temperature.

7. The vehicle of claim 6, wherein each of the data maps that is indexed by the SCR temperature is also indexed by one of: exhaust flow rate, estimated SCR efficiency, loading of the SCR device, temperature gradient of the SCR device, or NOx levels as measured by a front NOx sensor positioned upstream of the SCR device.

8. The vehicle of claim 1, wherein each of the binary maps has at least nine cells.

9. A method for use in a vehicle having a controller, an internal combustion engine, and an exhaust system having a selective catalytic reduction (SCR) device and a rear NOx sensor positioned downstream of the SCR device, the method comprising:
recording a plurality of data maps in memory of the controller, wherein each of the data maps is indexed by a different pair of exhaust system performance values, and wherein cells of each of the data map are populated by estimated downstream NOx levels;
recording a plurality of binary maps each having at least nine cells in the memory of the controller, wherein each of the binary maps is indexed by a corresponding one of the pairs of exhaust system performance values, and wherein each of the at least nine cells is populated by a 1 or a 0;
receiving, via the controller, the exhaust system performance values, including downstream NOx level measurements from the rear NOx sensor;
extracting information from the data maps and the binary maps; and
verifying, via the controller, the plausibility of the downstream NOx level measurements from the rear NOx sensor using the extracted information, including:
comparing, via the controller, the downstream NOx level measurements to calibrated thresholds for a plurality of different vehicle throttle events to thereby verify the plausibility of the downstream NOx level measurements; and
executing a control action with respect to the exhaust system using the NOx level measurements from the rear NOx sensor and the extracted information from the data maps, including diagnosing performance of the rear NOx sensor within the exhaust system.

10. The method of claim 9, further comprising:
using the controller to associate pairs of the received exhaust system performance values with a corresponding one of the data maps.

11. The method of claim 9, further comprising:
receiving the exhaust system performance values via the controller;
associating each pair of the exhaust system performance values with a corresponding one of the data maps;
identifying the cell in each of the data maps that corresponds to the associated pair of exhaust system performance values for that particular data map;
extracting the binary value corresponding to each identified cell from corresponding binary map; and
verifying the plausibility of the downstream NOx level measurements only when each of the extracted binary values has the same binary value.

12. The method of claim 9, wherein the exhaust system includes a temperature sensor operable for measuring an SCR temperature of the SCR device, and wherein recording a plurality of data maps includes indexing at least one of the data maps by the measured SCR temperature.

13. The method of claim 12, further comprising:
indexing each of the data maps indexed by the measured SCR temperature by an additional one of: exhaust flow rate, estimated SCR efficiency, loading of the SCR device, temperature gradient of the SCR device, or NOx levels as measured by a front NOx sensor positioned upstream of the SCR device.

14. A controller for a vehicle having an engine and an exhaust system that includes a rear nitrogen oxide (NOx) sensor, the controller comprising:
a host machine having a processor that is in communication with the rear nitrogen oxide (NOx) sensor, wherein the rear NOx sensor is positioned downstream of a selective catalytic reduction (SCR) device and transmits measured downstream NOx levels to the processor; and
tangible, non-transitory memory on which is recorded:
process instructions that are executable by the processor;
a plurality of data maps each indexed by a different pair of exhaust system performance values, and each having a plurality of cells, wherein the cells of each data map are populated by estimated downstream NOx levels; and
a plurality of binary maps each indexed by a corresponding one of the pairs of exhaust system performance values, and each having a plurality of cells, wherein each cell of each binary map is populated by a binary value of 1 or 0;
wherein the processor is configured to selectively execute the process instructions such that the host machine extracts information from the data maps and from the binary maps, and thereafter verifies the plausibility of the measured downstream NOx levels from the rear NOx sensor using the extracted information, and to execute a control action with respect to the exhaust system using the NOx level measurements from the rear NOx sensor and the extracted information from the data maps, including identifying ideal entry conditions for diagnosing performance of the rear NOx sensor within the exhaust system.

15. The controller of claim 14, wherein the processor is configured to:
receive the exhaust system performance values;
associate each pair of the exhaust system performance values with a corresponding one of the data maps;
identify the cell in each of the data maps that corresponds to the associated pair of exhaust system performance values for that particular data map;
extract the binary value corresponding to each identified cell from corresponding binary map; and
verify the plausibility of the downstream NOx levels from the rear NOx sensor only when each of the extracted binary values has the same value.

16. The controller of claim 15, wherein the exhaust system includes a temperature sensor operable for measuring an SCR temperature of the SCR device, and wherein at least one of the data maps is indexed by the SCR temperature.

17. The controller of claim 16, wherein each of the data maps indexed by the SCR temperature is also indexed by one of: exhaust flow rate, estimated SCR efficiency, loading of the SCR device, temperature gradient of the SCR device, or NOx levels as measured by a front NOx sensor positioned upstream of the SCR device.

18. The controller of claim 17, wherein each of the binary maps has at least nine cells.

* * * * *